United States Patent

Anderson

[15] 3,644,982
[45] Feb. 29, 1972

[54] VALVE STEM EXTRACTOR-INSERTER

[72] Inventor: Jimmy J. Anderson, 3032 Karla Circle, Shreveport, La. 71108

[22] Filed: July 31, 1969

[21] Appl. No.: 846,406

[52] U.S. Cl............................................29/213, 132/505.18
[51] Int. Cl..............................................................B23p 19/04
[58] Field of Search..............................29/213; 137/505.18

[56] References Cited

UNITED STATES PATENTS

| | | | |
|---|---|---|---|
| 1,045,289 | 11/1912 | Hill | 29/213 X |
| 1,950,307 | 3/1934 | Ivins | 29/213 X |
| 2,250,244 | 7/1941 | Yancey | 29/213 |
| 2,396,964 | 3/1946 | O'Brian | 29/213 |
| 2,829,429 | 4/1958 | Mueller et al | 29/213 |
| 2,870,629 | 1/1959 | Willis | 29/213 X |

Primary Examiner—Andrew R. Juhasz
Assistant Examiner—Leon Gilden
Attorney—John M. Harrison

[57] ABSTRACT

A tool for removing stems from and inserting stems into nonrising stem, valve assemblies while the valve assembly is under fluid pressure is provided which comprises an adjustable attachment assembly for clamping the tool to a valve bonnet, a hollow cylindrical tool housing made up of readily separable sections and an extractor-inserter shaft equipped with a stem carrying workhead. The extractor-inserter shaft is carried within the tool housing and is both axially slidable relative to the housing and rotatably mounted within the housing, about its longitudinal axis, to effect the insertion or removal of a valve, stem from a valve assembly. A lower section of the cylindrical tool housing is provided with a valve for sealing off the upper portion of the housing to permit the removal of an extractor stem with the damaged valve stem from the workhead of the extractor-inserter shaft and the mounting of another valve stem on the workhead of extractor-inserter shaft even when the valve is under pressure.

5 Claims, 3 Drawing Figures

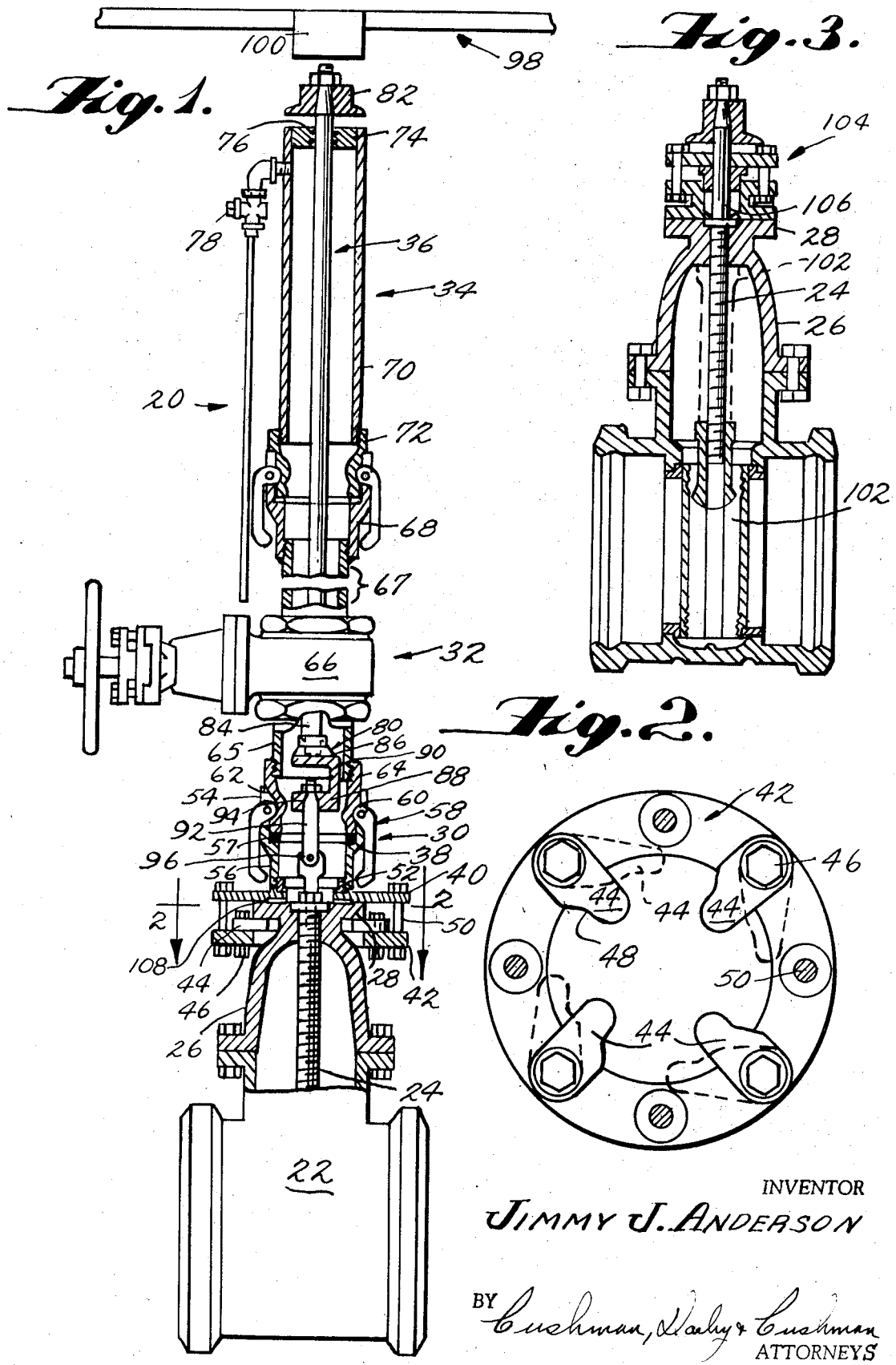

VALVE STEM EXTRACTOR-INSERTER

BRIEF DESCRIPTION OF THE INVENTION

The present invention relates to a tool for removing and replacing valve stems and, in particular, to a tool for removing and replacing valve stems from a valve assembly while the valve assembly is part of a system under fluid pressure.

It is a primary object of the present invention to provide a tool for quickly and easily replacing broken valve stems and the like in valve assemblies which are under fluid pressure thereby eliminating the need to shut down a line when a valve stem in the line becomes damaged.

It is a further object of the invention to provide a simple and, therefore, relatively inexpensive apparatus of the type under consideration for accomplishing this object.

In the preferred form of carrying out the above objects, the tool comprises an extractor-inserter shaft mounted within a housing made up of three readily detachable sections. The lowermost section of the housing is provided with a pair of axially spaced annular plates with the upper plate adapted to engage the upper surface of a valve bonnet flange and the lower plate having lugs thereon that can be rotated from a storage position to engage the underside of the bonnet flange to mount the tool on the valve assembly. The intermediate section of the housing is provided with a valve which, when closed, seals the upper portion of the housing from the lower portion of the housing and this section is coupled to the lowermost section of the housing by quick-release coupling means. The uppermost section of the housing is coupled to the intermediate section of the housing by quick-release coupling means and is provided with a stopcock for releasing the fluid pressure from the upper housing after the valve in the intermediate section of the housing has been closed.

The inserter-extractor comprises a shaft slidably and rotatably received within the uppermost section of the housing. This shaft is provided with a workhead at one end and a means for rotating the shaft at the other end protrudes beyond the uppermost section of the housing. An extractor stem, having a universal joint, is carried by the workhead to facilitate removal of a damaged valve stem. However, when inserting a new valve stem, the valve stem is carried directly by the workhead and the extractor stem can be dispensed with.

The above objects and advantages of the present invention will become more apparent and other objects and advantages of the present invention will become apparent from the following detailed description when taken in conjunction with the accompanying drawings in which:

FIG. 1 is a side elevational view partially in section of the tool clamped to a valve assembly with the extractor stem of the tool threaded into a broken stem and the removal of the stem about to commence;

FIG. 2 is a plan view of the lower plate of the tool attachment assembly taken substantially along lines 2—2 of FIG. 1; and FIG. 3 is a side sectional view of a typical valve assembly with a damaged stem in need of replacement.

DETAILED DESCRIPTION OF THE INVENTION

Referring now to the drawings and, in particular to FIG. 1, a preferred form of the valve stem extractor-inserter tool 20 is shown mounted on a valve assembly 22 having a nonrising stem 24 and a bonnet 26 with an annular flange 28. The valve assembly 22 is of conventional construction and is shown in detail in FIG. 3 to facilitate the understanding of the operation of the valve stem extractor-inserter tool 20.

Turning now to the valve stem extractor-inserter tool 20, the tool comprises a housing made up of three sections 30, 32 and 34, respectively, and an extractor-inserter shaft 36 which is housed within the above-mentioned sections. While a preferred form of the invention is set forth in FIG. 1, it is to be understood that the embodiment of the invention set forth is exemplary in that certain modifications and equivalents can be resorted to without departing from the scope of the invention.

The lowermost housing section 30 is made up of a sleeve 38 and annular plates 40, 42 that are mounted on the lower end of sleeve 38 and form an adjustable attachment assembly. As best shown in FIG. 2, annular plate 42 is provided with a plurality of lugs 44 which are secured to the plate by bolt assemblies 46 which pass through aligned apertures provided in lugs 44 and plate 42. The bolt assemblies 46 have unthreaded upper portions which extend intermediate the upper surface of plate 42 and the bolt heads to thereby facilitate the rotation of the lugs 44 from the position shown in FIGS. 1 and 2, wherein the lugs extend radially inward so that they will engage the underside of flange 28, to a second position, shown in phantom line in FIG. 2, wherein the lugs are in a retracted position to permit the passage of the plate 42 over flange 28. In addition to being rotatably mounted on plate 42, the lugs 44 have a concave surface 48 on one side so that when they are swung into the retracted position, the lugs will clear flanges of greater diameters than would otherwise be possible. It should also be noted that the ease with which the lugs 44 can be rotated is governed by the torque applied to bolt assemblies 46 with these assemblies being capable of adjustment to a particular torque so that the lugs will not be too loosely or too tightly held to plate 42.

Plate 42 is secured to plate 40 by bolt assemblies 50 which pass through aligned apertures in plates 40, 42. Plate 40 extends inwardly farther than plate 42 with the opening of plate 40 being large enough to allow the insertion or removal of a valve stem from the assembly 22 but small enough so that the underside of an innermost portion of the plate engages the upper surface of flange 28. With this construction, by tightening bolt assemblies 50 with the lugs of plate 42 directed inwardly, the lowermost section 30 of the housing can be firmly clamped into position on the flange 28 of the valve assembly. To remove section 30, one merely loosens bolt assemblies 50, rotates lugs 44 to their retracted position and lifts section 30 vertically.

As shown, plate 40 is provided with an annular flange 52 which projects above the upper surface of the plate 42 into sleeve 38. Flange 52 can be an integral portion of plate 40 or welded or otherwise suitably secured to the plate. Flange 52 secures plate 40 to sleeve 38 and can be threaded into sleeve 38, welded to sleeve 38 or otherwise rigidly affixed to sleeve 38.

Sleeve 38 has upper and lower portions 54, 56 with different internal and external diameters and is provided with an O-ring 57 which rests on the shoulder formed between the upper and lower portions of the sleeve. In addition, the upper portion 54 of the sleeve 38 is provided with a plurality of cam members 58 which are pivotally secured by pins to the sleeve and provide a means for readily securing the intermediate section 32 of the housing to the lower section 30. The lobes 60 of the cam members project inwardly through slots in portion 54 and can be pivoted by the handles of the cam members from the locking position shown wherein the lobes of the cams protrude into an annular recess 62 of coupling sleeve 64 of the intermediate housing section 32 to a retracted position merely by lifting the handles upward. With the lobes 60 retracted from the annular recess 62 of the intermediate section 32, sections 30 and 32 can be readily detached.

In addition to lower coupling sleeve 64, intermediate housing section 32 comprises a gate valve 66, an upper coupling sleeve 68 and sleeves 65, 67 which interconnect gate valve 66 with sleeves 64, 68. As shown all of the above components are joined by being threaded into each other. However, the components 64 to 68 can be welded or otherwise affixed to each other if desired. The gate valve 66 of intermediate section 32 is a conventional gate valve which, when open, permits the extractor-inserter shaft 36 to pass through section 32. When closed, the valve seals the upper portion of intermediate section 32 from the lower portion of section 32 so that the uppermost section 34 of the housing can be uncoupled from section 32 during the replacement of a valve stem in a valve assembly under pressure.

The uppermost housing section 34 comprises an elongated tubular member 70 having a coupling sleeve 72 at its lower end and bushing 74 mounted within and affixed to its upper end. Since the joint formed by coupling sleeves 68 and 72 is identical in construction to the joint formed between coupling sleeves 38 and 64, the joint formed between sleeves 68 and 72 will not be described in detail to avoid unnecessary repetition. However, it is to be understood that the couplings between housing sections 32 and 30 and housing sections 34 and 32 are the same.

The bushing 74 in the upper end of sleeve 70 is welded or otherwise rigidly secured to the inner surface of the sleeve. A pair of O-rings 76 are retained in annular grooves within the bushing and cooperate with extractor-inserter shaft 36 to prevent any leakage between shaft 36 and bushing 74.

Housing section 34 is also provided with a stopcock 78 adjacent its upper end which can be opened to exhaust any pressurized fluid from the upper portion of the housing after gate valve 66 has been closed and before section 34 is uncoupled from section 32. The stopcock 78 is conventionally constructed and any suitable stopcock can be used which will permit the selective venting of section 34 to the atmosphere.

Extractor-inserter shaft 36 is equipped with a workhead 80 mounted at its lower end and an operating nut 82 mounted adjacent its upper end. The workhead 80 is press-fit, threaded to or otherwise affixed to the lowermost portion of shaft 36. Relative rotation between shaft 36 and workhead 80 is prevented by means of a key 84 which is received within complementary keyways provided in the shaft and the workhead.

The workhead 80 is substantially channel shaped in vertical cross section with spaced-apart, parallel upper and lower flanges 86, 88 that are joined by a web 90. The upper flange is provided with the aperture which receives shaft 36 and the lower flange, which is spaced apart from the upper flange a distance sufficient to permit the mounting and dismounting of valve stems 24 and the extractor stem 92, is provided with a central aperture 94 for retaining a valve stem 24 or the extractor 92. Aperture 94, which is aligned with the centerline of shaft 36 to minimize any undesirable movement or wobbling of the assembly during insertion or removal of a valve stem, is tapered to receive the upper end of a valve stem 24 or the extractor stem 92 and is rectangular in horizontal cross section.

When removing a damaged stem 24 from a valve assembly, extractor stem 92 is mounted within aperture 94 of the workhead. Extractor stem 92 comprises upper and lower portions joined by a universal joint 96 with the upper portion having a tapered portion of rectangular horizontal cross section that fits within aperture 94 and a threaded free end which receives a lock nut to secure the extractor stem to the workhead. The lower portion of the extractor stem 92 has a threaded portion thereon which is adapted to be received within an aperture drilled and tapped in the damaged stem 24 so that the extractor stem can be secured to the damaged valve stem and the stem removed from the valve assembly as will be more fully explained hereinafter. When inserting a new valve stem into a valve assembly, the extractor stem 92 is dispensed with and the stem of the valve is mounted directly in the aperture 94 of the workhead.

The extractor-inserter shaft 36 is tapered adjacent its upper end and has a threaded free end which receives a locknut to rigidly secure operating nut 82 on the stem. To prevent relative rotation between shaft 36 and the operating nut, the horizontal cross sections of the tapered portion of shaft 36 and the aperture within operating nut 82 are rectangular, or the nut 82 can be keyed to or otherwise mounted on shaft 36 to prevent relative rotation.

The shaft 36 is turned by operating handle 98 which has a sleeve 100 that fits over operating nut 82. The sleeve 100 on handle 98 has an aperture therein complementary to the outside configuration of the operating nut, which is rectangular in horizontal cross section, so that the handle can be readily mounted on or removed from the shaft 36 when desired and no relative rotation between the handle 98 and shaft 36 takes place.

In operation, prior to clamping the tool 20 in place on the valve bonnet 26, the valve gate 102 must be adjusted and the upper components of the valve assembly must be removed so as to expose flange 28. First, the valve gate 102 is opened to the fully opened position (shown in phantom line in FIG. 3) so that the gate abuts the upper inner surface of the valve bonnet and forms a seal. Then, the valve stem locknut, the operating nut, the packing gland and all the plates above flange 28 (valve components 104) are removed from the top of the bonnet exposing the upper portion of valve stem 24 and flange 28. Next, the damaged portion of the valve stem, which is represented by crack 106, is cutaway by means of a hacksaw or similar means and the undamaged portion of the valve stem 24 is first drilled and then tapped to receive the lower portion of the extractor stem 92. The valve assembly 22 is now ready to accept the valve stem extractor-inserter tool 20.

The valve stem extractor-inserter tool 20 is completely unassembled before placing any part of the tool on the valve to be repaired. First, the lowermost section 30 of the housing is placed on top of the bonnet 26 and the lugs 44 are turned to the position shown in FIGS. 1 and 2 after which the bolt assemblies 50 are tightened to firmly clamp the lower housing section 30 in position on the valve bonnet 26 with the lower housing section centered over the aperture in the bonnet through which the valve stem 24 passes. A gasket blank 108 is inserted between the upper surface of flange 28 and the under side of plate 42 to insure that there is no leakage between section 30 of the housing and the valve bonnet. Next, the extractor stem 92 is threaded into the hole tapped in the valve stem, as shown in FIG. 1, and the upper portion of the extractor stem is placed in the workhead 80 of the extractor-inserter shaft 36 and locked in place with the locknut. The intermediate section 32 of the housing with the gate valve 66 open is now placed over the extractor-inserter shaft 36 and locked in place on section 30 by the quick-release coupling. Due to the downward force exerted on the intermediate section 32 of the housing by the cam members 58 of section 30, the intermediate section of the housing is firmly locked in place and with the compression of O-ring 57 no leakage will occur between the sections 30, 32. Next, the uppermost section 34 of the housing is clamped in place on section 32 with the extractor-inserter shaft 36 passing up through the bushing 74 within the end of the section 34. The operating nut 82 is now placed on shaft 36 and locked in place by means of the locknut. The valve stem extractor-inserter tool 20 is now ready to operate as soon as the handle is put into position.

To commence the removal of the valve stem 24, the handle 98 is placed in position and stopcock 78 is opened. The operating handle is now turned until the extractor stem 92 turns the valve stem 24 and allows water to enter the tool housing. The stopcock 78 is turned off after air and water have been released and the interior of the housing is pressurized. Due to the use of the O-rings 76 in bushing 74, through which the extractor-shaft 36 passes, and O-rings 57 of the housing section couplings, no leakage occurs between shaft 36 and the housing or between the housing sections.

The turning of the operating handle 98 continues so as to close the valve gate 102 with a downward pressure being maintained on the operating handle (usually two men operate the tool) in opposition to the water or r fluid pressure within the system. Once the valve gate 102 bottoms (see FIG. 3), the valve stem 24 begins to rise relative to the valve gate 102 until it eventually is separated from the valve gate and can be removed. During the above operation wherein the stem 24 is being turned by extractor-inserter shaft 36 and extractor stem 92, the universal joint of extractor stem 92 facilitates the smooth operation of the tool even if the hole which has been tapped in the damaged valve stem is somewhat offcenter.

The operator of the tool then allows the extractor-inserter shaft 36 of the tool, along with the attached workhead 80, extractor stem 92 and valve stem 24, to rise within the tool housing until the valve stem 24 is above the gate valve 66 in the intermediate housing section 32. Once the valve stem 24 is above the gate valve 66, the gate valve 66 is closed and the stopcock 78 in the upper housing section 34 is opened to permit the pressurized fluid within the upper section to be exhausted so that the upper section 34 of the housing can be removed from the intermediate section 32 of the housing without pressure within the upper portion of the housing making the uncoupling of the sections difficult. The operating handle 98 is now removed along with the locknut and operating nut 82. The quick-release coupling between housing sections 32 and 34 is opened to remove the upper housing section 34 from the intermediate housing section 32. Finally, the extractor-inserter shaft 36 is removed from the upper section 34 of the housing and the extractor stem 92 is removed from the workhead 80 along with the valve stem 24.

To insert a new valve stem (not shown) into the valve assembly 22 being repaired, once the extractor stem 92 has been removed from the workhead, the new valve stem is mounted on the workhead 80 and secured therein by means of a locknut with the complementary rectangular, horizontal cross sections of the aperture 94 in the workhead and the new valve stem preventing relative rotation of these members. The valve stem, the workhead 80 and the extractor-inserter shaft 36 are now placed in the intermediate section 32 with the shaft protruding from the upper end of this section. Next, upper housing section 34 is placed over extractor-inserter shaft 36 with the shaft protruding up through bushing 74 of the housing section and the housing section is securely coupled to the intermediate housing section 32 by the quick coupling assembly 68, 72.

The operating nut 82 is placed on shaft 36 and locked in place with the lock nut and the operating handle is placed on the operating nut. The stopcock 78 is opened after which valve 66 is opened to pressurize the upper section of the housing. Once the air and some fluid have been vented from the upper section of the housing, stopcock 78 is turned off, valve 66 is fully opened and downward pressure is exerted on shaft 36 through the operating handle to move the shaft along with the new valve stem down into the valve assembly 22.

Once the new valve stem contacts the valve gate 102, the operating handle, shaft 36 and the valve stem are turned in the opposite direction to that in which the assembly was turned during the removal of the damaged stem so as to screw the new valve stem into the valve gate 102. The new stem is turned into the valve gate 102 until the gate rises to the fully opened position and abuts the upper interior surface of the valve bonnet 26 to seal off the fluid pressure within the valve from the housing of the extractor-inserter tool 20. After venting the housing of the extractor-inserter tool, through the stopcock 78, the extractor-inserter tool is disassembled with the new valve stem being detached from the workhead 80 of the extractor-inserter 36 prior to the removal of the extractor-inserter shaft. The upper components 104 of the valve assembly 22 are then replaced and the valve is ready for operation.

While the preferred form of the invention has been shown and described, it is to be understood that all suitable modifications and equivalents may be resorted to which fall within the scope of the invention.

I claim:

1. A tool for removing valve stems from and inserting valve stems into valve assemblies when said valve assemblies are under pressure comprising:

first and second spaced apart plates interconnected by adjustable means with said first plate adapted to abut an upper surface of said valve assemblies and said second plate having lug means thereon adapted to be received beneath a flange of said valve assemblies whereby said first and second plates can be adjusted relative to one another to secure said tool to said valve assemblies;

a housing comprising first and second tubular housing means;

said first tubular housing means carried on said adjustable mounting means, said first tubular housing means having valve means intermediate the ends thereof for selectively sealing a first end of said first tubular housing means from a second end of said first tubular housing means; and said second tubular housing means releasably secured to said first tubular housing means, said second tubular housing means having a venting means and carrying valve stem inserter and extractor means which is slidably and rotatably mounted within said second tubular housing means, said second housing means being detachable from said first housing means to permit access to said valve stem extractor and inserter means for the removal of the valve stem from said extractor and inserter means after said valve means of said first tubular housing means has been closed to seal off an upper portion of said housing and said upper portion of said housing has been vented to the atmosphere by said venting means and for the mounting of a new valve stem on said valve stem extractor and inserter means.

2. In the tool of claim 1:
said valve stem extractor and inserter means comprising a shaft, means for turning said shaft and workhead means comprising spaced-apart, essentially parallel upper and lower flanges, joined by a web, the lower of said flanges being fitted with an aperture for receiving said valve stems.

3. In the tool of claim 1:
said valve stem extractor and inserter means comprising a shaft, means for turning said shaft, workhead means for carrying a valve stem and extractor stem means comprising upper and lower portions joined by a universal joint, said upper portion having a threaded, tapered end adapted to fit within an aperture in said workhead, and said lower portion having a threaded end adapted to be received within an aperture drilled and tapped in said valve stems to permit extraction of said stems from said valve.

4. In the tool of claim 1:
said lugs being pivotally carried on said second plate so that they can be rotated from an extended position to a retracted position.

5. In the tool of claim 1:
said first tubular housing and said adjustable mounting means being secured to each other by quick coupling and uncoupling means.

* * * * *